Figures 1, 1A:
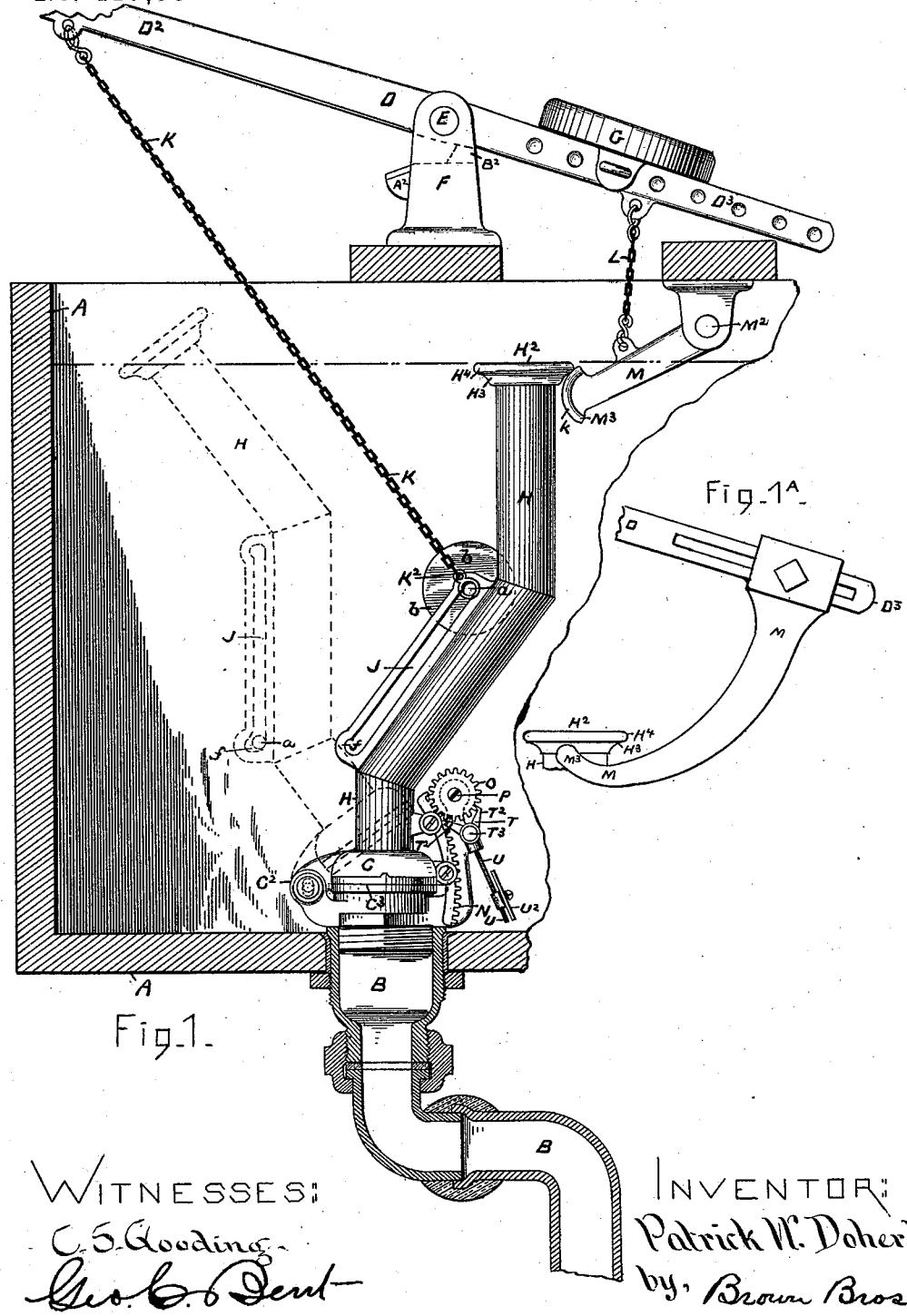

(No Model.) 4 Sheets—Sheet 1.

P. W. DOHERTY.
OPERATING MECHANISM FOR VALVES OF WATER CLOSET OR OTHER TANKS.

No. 417,356. Patented Dec. 17, 1889.

WITNESSES:
C. S. Gooding
Geo. C. Dent

INVENTOR:
Patrick W. Doherty
by Brown Bros.
Atty's.

(No Model.) 4 Sheets—Sheet 2.
P. W. DOHERTY.
OPERATING MECHANISM FOR VALVES OF WATER CLOSET OR OTHER TANKS.
No. 417,356. Patented Dec. 17, 1889.
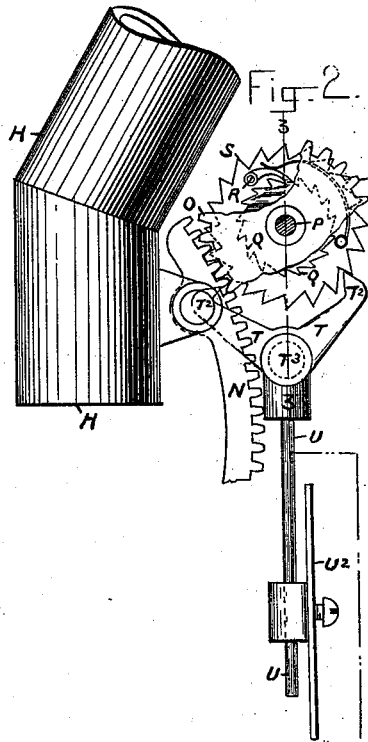
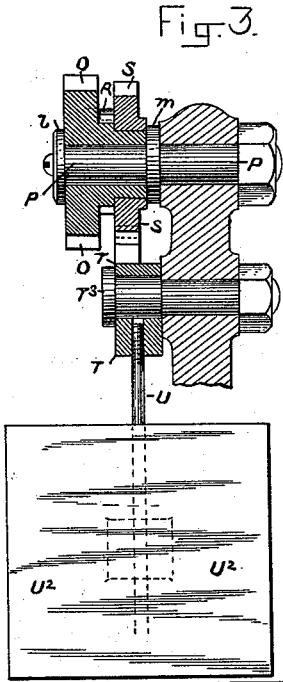
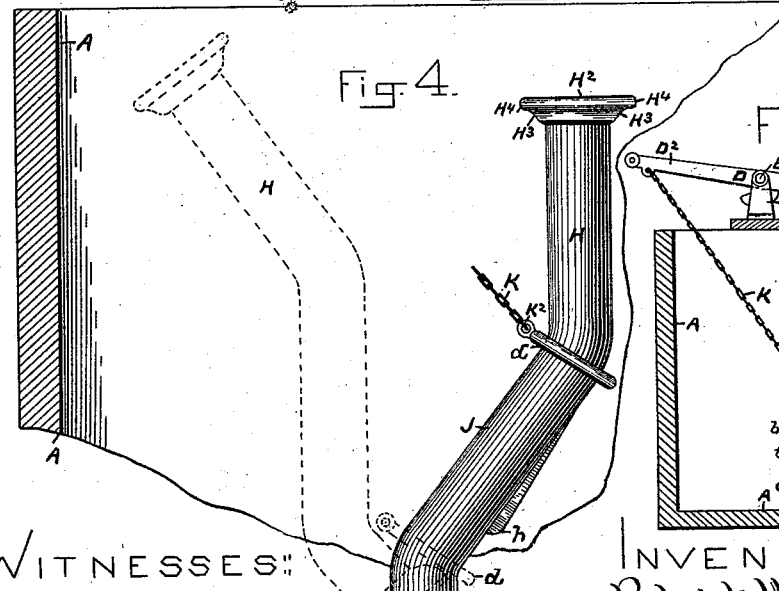
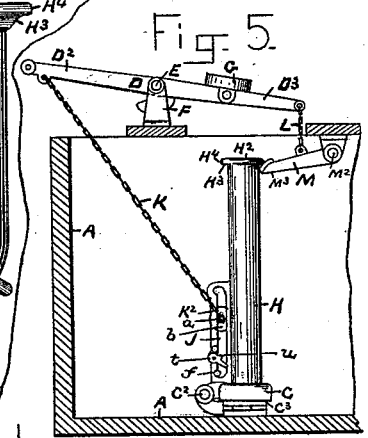
WITNESSES:
C. S. Gooding
Geo. H. Bent
INVENTOR:
Patrick W. Doherty
by Brown Bros.
Atty's.

(No Model.)  4 Sheets—Sheet 3.

P. W. DOHERTY.
OPERATING MECHANISM FOR VALVES OF WATER CLOSET OR OTHER TANKS.

No. 417,356.  Patented Dec. 17, 1889.

WITNESSES:
C. S. Gooding.
Geo. C. Dent

INVENTOR:
Patrick W. Doherty
by, Brown Bros.
Atty's.

(No Model.) 4 Sheets—Sheet 4.
P. W. DOHERTY.
OPERATING MECHANISM FOR VALVES OF WATER CLOSET OR OTHER TANKS.
No. 417,356. Patented Dec. 17, 1889.
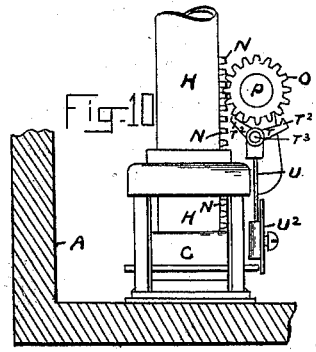
Fig. 10.
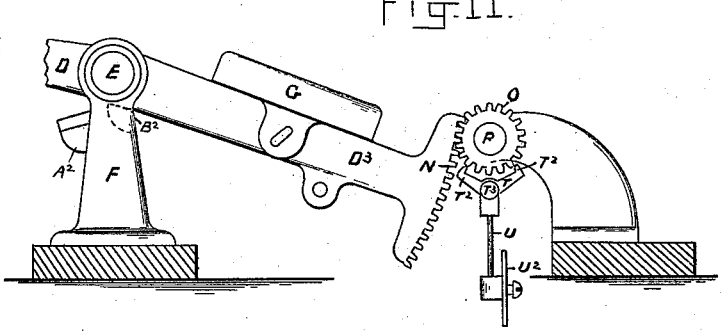
Fig. 11.
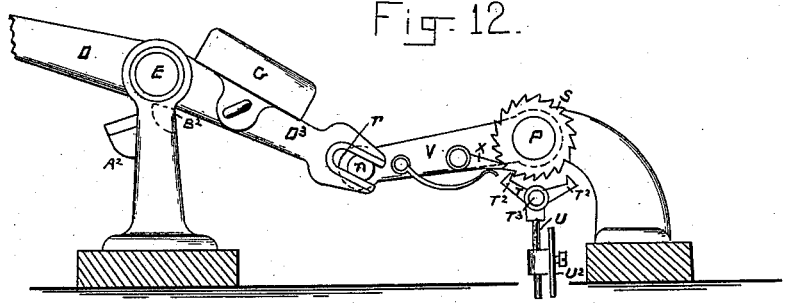
Fig. 12.
Fig. 13.
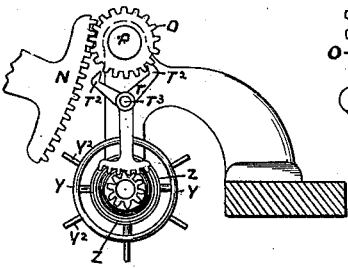
Fig. 14.
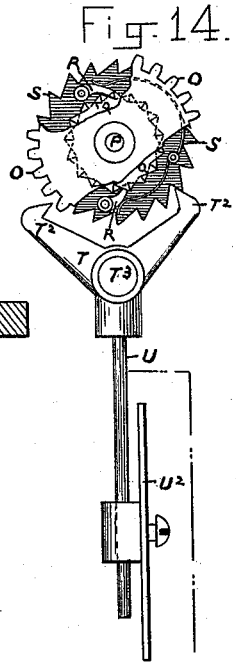
Fig. 15.
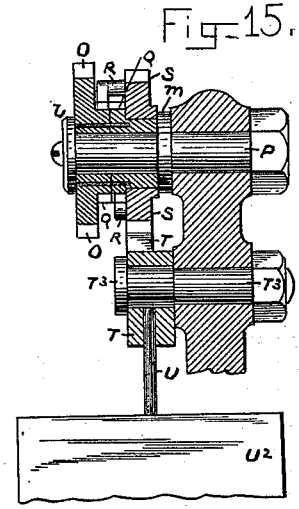
Witnesses:
C. S. Gooding
Geo. C. Dent
Inventor:
Patrick W. Doherty.
by: Brown Bros Atty's.

UNITED STATES PATENT OFFICE.

PATRICK W. DOHERTY, OF BOSTON, MASSACHUSETTS.

OPERATING MECHANISM FOR VALVES OF WATER-CLOSET OR OTHER TANKS.

SPECIFICATION forming part of Letters Patent No. 417,356, dated December 17, 1889.

Application filed September 3, 1888. Serial No. 284,510. (No model.)

*To all whom it may concern:*

Be it known that I, PATRICK W. DOHERTY, of the city of Boston, in the county of Suffolk and State of Massachusetts, have invented certain new and useful Improvements in Operating Mechanisms for Valves of Water-Closet or other Tanks, of which the following is a full, clear, and exact description.

This invention relates to mechanisms for operating valves of water-closet or other tanks to secure their opening and closing, and to mechanism for regulating, controlling, or governing the movement of the valve in its closing or opening, or in both its closing and opening.

The invention, in substance, consists, first, in the combination, with the opening and closing valve, which may be otherwise of the usual or any other suitable construction or arrangement, and a lever which is fulcrumed on a suitable support or equivalent mechanism therefor and suitably adapted to be operated, of an arm or extension of the valve having a pathway extending in a vertical direction, and a chain or other flexible or suitable line at one end connected to said operating-lever and at the other end connected to and free to move on and to engage with said pathway, and all otherwise, so that on a movement of the operating-lever in one direction said chain freely moves along said pathway, causing no movement of the valve, and on a movement of the operating-lever in the other and opposite direction said chain first engages and then disengages from said pathway, securing, first, an opening and then a releasing of the valve to close; second, in the combination, with the opening and closing valve, which may be otherwise of the usual or any other suitable construction or arrangement, and a lever which is fulcrumed on a stationary support or equivalent mechanism therefor and suitably adapted to be operated, of mechanism connecting said lever to the valve, which in one part consists of an arm operated by said lever and at one end free and adapted to engage and disengage from a shoulder carried by the valve, and which in its other part is constructed and arranged as well known, or otherwise suitably, and all otherwise, so as in each direction of movement of the operating-lever to secure an opening of the valve, to be followed in each instance by its close; third, of an opening and closing valve, which may be of the usual or any other suitable construction or arrangement, and mechanism suitable to secure its opening and closing, in combination with an escape-wheel and pallet mechanism in communication or connection with the valve, particularly as hereinafter described, and whereby the opening and closing movements of the valve may be governed, regulated, or controlled.

Further than above, the invention consists of other improvements in detail, all substantially hereinafter described.

In the drawings forming part of the specification, Figure 1 is a longitudinal vertical section of a water-tank and its discharge-pipe and a side elevation of the valve closed and mechanisms of this invention to secure an opening of the valve on both movements of the operating-lever and to allow the valve after each opening to close and regulate it in each closing movement. The valve is also shown in dotted lines as open. Fig. 1$^A$ is a view in detail modification, as hereinafter appears. Fig. 2 is a face view, enlarged, of the mechanism of Fig. 1 to regulate the close of the valve. Fig. 3 is a vertical section, line 3 3, Fig. 2. Figs. 4 and 5 are views in detail, hereinafter particularly described, and illustrating modifications in the construction of the pathway of the valve and chain engaging it and connecting it and the operating-lever. Figs. 6, 7, 8, and 9 are similar views to Fig. 1, on a reduced scale, and otherwise, as will hereinafter appear. Figs. 10, 11, 12, 13, 14, and 15 are views illustrating modifications in construction, arrangement, and application of the valve controlling or regulating mechanism of this invention, all as hereinafter described.

In the drawings, A is a tank.

B is a discharge-pipe leading from the bottom of the tank.

C is a valve for opening and closing the discharge-pipe at the tank and at one side $C^2$ hinged to a suitable stationary support and valve-seat $C^3$, and D is a lever having a fulcrum E of a stationary support F of the tank and at one end $D^2$ suitably connected by a chain and pull (not shown) or otherwise, (not shown,) as well known, so as thereby to be moved in one direction, and at its other end D³ weighted at G, or otherwise suitably adapted, and as well known, so as thereby to be moved in the other and opposite direction on a release of the power or force applied to its end D² to move it, and all and otherwise, except as to the features of this invention, as well known in water-tank systems of dwelling-houses, buildings, &c., or otherwise suitably, and therefore needing no more particular description herein.

H is an upright or vertical arm or extension of the valve C, and, as shown, constituting the overflow-pipe of the tank, opening (not shown) at its upper end H² to the water-space of the tank and at its lower end (not shown) having communication through the thickness of the valve with the discharge-pipe B, and all in itself, neither as a whole nor as to its separate parts forming, except as hereinafter stated, any part of this invention.

J is a pathway on and along the valve-extension H in the direction and for a portion of its length. In Figs. 1, 5, 6, 7, 8 and 9 this pathway J is shown as a slot, and in Figs. 1, 6, 7, 8 and 9 it runs in an oblique direction and at an angle intersecting, and in Fig. 5 it runs in a direction parallel with the vertical axial line of the valve either opened or closed. In Fig. 4 this pathway J is shown as the valve-extension H itself, and it runs in an oblique direction and at an angle intersecting the vertical axial line of the valve, either opened or closed. However, it might run in a direction parallel with said axial line the same as slot Fig. 5.

K is a chain (but it may be any other line of a suitable character) at one end permanently connected to the operating end D² of operating-lever D and at its other and opposite end permanently connected to the pathway J of the valve. With the valve closed and operating-lever D in its normal position this chain K is practically taut and extends in a direction obliquely to the vertical axial line of the valve, and its lower end K², connected to the pathway J of the valve, is at the upper end or limit of said pathway, and with the operating end D² of the operating-lever at the limit of its downward movement this chain K is slack and hangs loosely, and its end K² is at the lower end or limit of said pathway, having, as the operating-lever moved from its normal position to the position stated, traveled, slack and loose, along the pathway from its upper to its lower end.

In Figs. 1, 5, 6, 7, 8, and 9 the connection of chain K with pathway J of valve consists of a roller or pin a, which is carried by the chain and enters and crosses from the opposite sides of the pathway-slot and has at one of its ends a collar or disk b, co-operating with the chain at its opposite end to hold pin a against later disengagement from the slot at either side.

In Fig. 4 the connection of chain K with pathway J of valve consists of a ring d, which encircles it.

The pathway J in all cases—at its lower end, preferably—is constructed, as for illustration, with a notch f, Figs. 1, 5, 6, 7, 8, and 9, or with a projected shoulder h, Fig. 4, to insure the engagement of the end K² of chain with that end of the pathway on the return of the operating end D² of the operating-lever to its normal position, and on which return the valve is opened, as will hereinafter more fully appear.

L is a chain (but it may be any other line of a flexible or suitable character) at one end connected to weighted end D³ of operating-lever and at the other end connected to an arm or lever M between its two ends. This lever M is placed under operating-lever D, and its end M² is fulcrumed to the stationary support F, and its opposite end M³ is left free. The free end of lever M is flanged and rounded off, as at k, and in the normal position of the operating-lever D it lies under a horizontal projection or shoulder H⁴ at the upper end of the valve-arm or overflow-pipe H, and this shoulder is on the under side of a flange H³, surrounding the valve-extension. On pulling down on the operating-lever D at its operating end D² the lever M, flexibly connected to it, as described, is swung upwardly on its fulcrum, and as its free end is engaged with the shoulder H⁴ of the valve-extension the valve is thereby swung on its hinge and opened until, by the continued movement of the operating-lever and opening movement of the valve, the free end of the lever M and shoulder H⁴ of valve-extension pass or escape from engagement, on which the valve, so far as such mechanism is concerned, is then left free to close, the chain K, in connection with pathway of valve, having during the meantime passed freely along said pathway to and become engaged with it at its lower end or limit. On the then return of the operating-lever to its normal position said lever, first having taken up the slack in the chain, then through the chain first pulls on and again opens the valve, and when at last the lever has reached its normal position, the chain-connection having become disengaged from the pathway J, the valve is left free to close, and during the meantime the lever M, flexibly connected to operating-lever D, returns to its normal position for operation, as before. The valve, as shown, closes from its own gravity; but obviously it may be arranged to close from its own, and gravity acquired after being opened or from other causes or means, all as well known.

Figure 6:
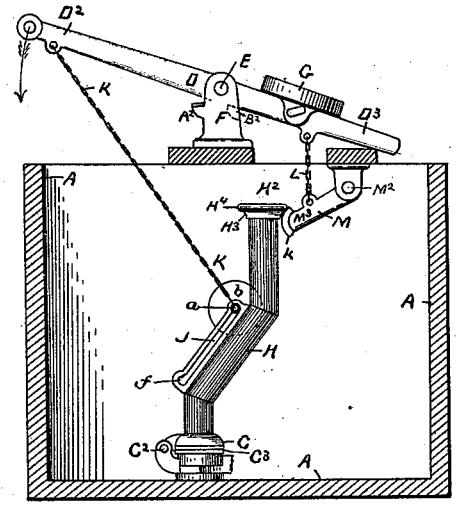
Figure 7:
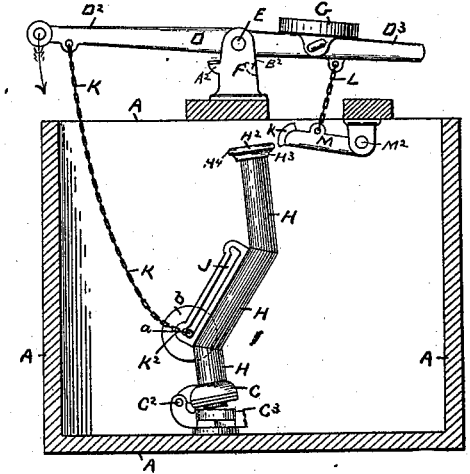
Figure 9:
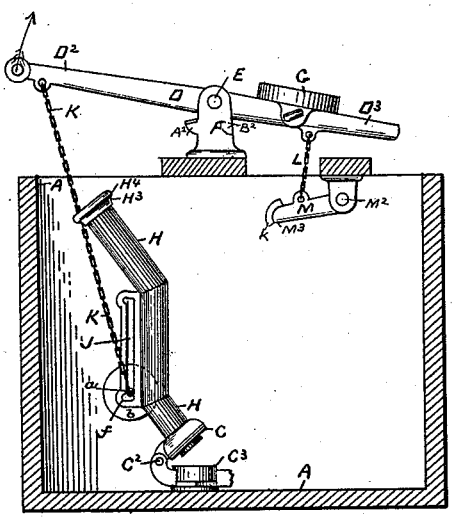
Figure 8:
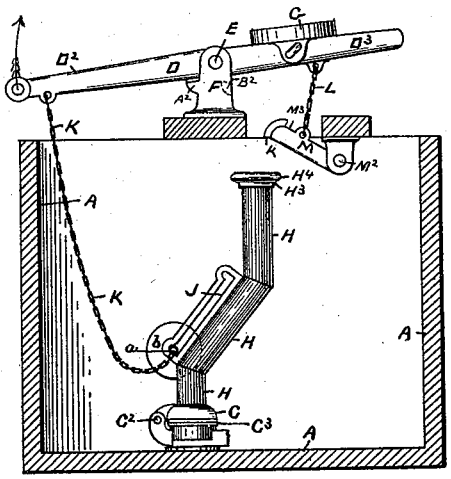

Figs. 6 to 9, both inclusive, illustrate the operating-lever D and its companion lever M in their positions at different portions of the movement of the operating-lever and the valve when opened and closed in relation thereto. In Fig. 6, as also Figs. 1 and 5, the levers D M are shown in their respective normal positions and the valve is closed. In Fig. 7 the operating-lever D is shown as having been moved sufficiently at its operating end D² from its normal position, Fig. 6, to have secured, through its companion lever M, an opening of the valve and an escape of the free end of said lever M from the shoulder H³ of the valve, leaving the valve free to close. In Fig. 8 the operating-lever is shown with its operating end as having reached the limit of its movement, the valve being closed. In Fig. 9 the operating-lever is shown as on its return movement and sufficiently to have secured, through the action of the chain-connection K and pathway J, an opening of the valve and to have left said connection free to travel one upon another and the valve free to close, the whole ending in a return of the several parts to their normal positions and in the closing of the valve, Fig. 6.

From the description given it is plain that in each direction of movement of the operating-lever the valve is opened, followed by its closing, thus securing two separate discharges of water from the tank, which, preferably, should be unequal in quantity, the smaller on the first and the larger on the second opening, so as to give to the closet-bowl connected to the discharge-pipe of the tank what are known as "preliminary" and "after" washes. This inequality in quantity of the washes is obtained by a less opening of the valve for the preliminary than for the after wash, and in the mechanism described it is provided for by an adaptation of the parts to open the valve on the first movement of the operating-lever to a lesser extent than on the second movement of the operating-lever.

To regulate or govern the movement of the valve, either from the operation of the lever mechanisms particularly explained or from any other suitable mechanism, or from the gravity or it and an acquired gravity of the valve or other cause, a pallet and escape-wheel mechanism is provided and combined and arranged in connection with either the valve or the operating mechanism therefor, all so that from its operation the movements of the valve in either or both directions, and at least in one direction, shall be thereby effected in speed, as may be desired. This pallet and escape-wheel mechanism constitutes an essential feature of this invention and is now to be described in detail and in various forms of its application.

In Figs. 1 and 2, N is a vertical segmental and toothed or geared rack-bar at one side of and stationary on the valve C, and having its teeth concentric with the axis of swing of the valve on its hinge at C².

O, Figs. 1, 2, and 3, is a vertical pinion gear-wheel turning loosely on a horizontal arbor P of the valve support and seat C³ or other part, which in the opening and closing movement of the valve is stationary relatively thereto. This pinion O meshes the rack-bar N, and on its inner face it carries a concentric ratchet-wheel Q, preferably integral and turning with it on the arbor P.

R is a spring-pawl, at one end fulcrumed on one face of an escape-wheel S and having its toe in position to engage the teeth of the ratchet-wheel Q in one direction and for said teeth to pass freely under it in the other and opposite direction of rotation of the ratchet-wheel.

When the pinion-wheel O is rotated in one direction from the movement in one direction of its meshing rack N, because of the movement of the valve by which it is carried, the pawl engaged with the ratchet-wheel secures the rotation of the escape-wheel in unison with the ratchet-wheel and its companion, the pinion-wheel O, and when the pinion-wheel is rotated in the other and opposite direction from the movement in the other and opposite direction of its meshing-rack, because of the movement of the valve by which it is carried, the ratchet-wheel freely passes under the toe of the pawl, and consequently the escape-wheel remains at rest, and its position of rest is insured by the engagement of the pallet with its teeth, as hereinafter described.

The ratchet, escape, and pinion wheels are confined on their common arbor P and against lateral or endwise movement by collars $l\ m$, located at opposite end portions of the arbor, and the pinion and combined ratchet and escape wheels, everything otherwise being suitable, are free to turn on their common arbor.

T is a pallet having at its opposite ends similar forks or arms T² T² and a fulcrum T³ on the stationary valve support and seat C³. The pallet is at the under side, and its arms or forks are situated in relation to the teeth of the escape-wheel, and all otherwise, so that the pallet can oscillate and in its oscillation place its opposite arms alternately in and out of engagement with the teeth of the escape-wheel, all as well known in watch, clock, and other similar movements, and preferably acting in conjunction with a vibrating pendulum or oscillating balance-wheel, or other device to control it.

U is the pendulum of the pallet, and U² is the bob of the pendulum, adapted, as well known, to be adjustable lengthwise, as also laterally, on the pendulum, and when adjusted fixed against accidental disturbance.

In Figs. 1, 2, and 3 in the opening movement of the valve the escape-wheel and pallet described remain stationary, as the then direction of rotation of the pinion-wheel O and its companion ratchet-wheel Q is such that the ratchet passes freely under the toe of the pawl R, and there is no engagement between the two. In the closing movement of the valve the escape-wheel and pallet described then operate, the escape-wheel to rotate and the pallet to vibrate or oscillate, as the then direction of rotation of the pinion-wheel and its companion ratchet-wheel is such that the ratchet-wheel and pawl engage. The vibration of pallet obviously regulates and governs the rotation of the escape-wheel, as described, and thus the movement of the valve to close is regulated and governed and, under the arrangement described, retarded.

The degree or extent of retardation of the movement of the valve, as above described, may be changed by shortening or lengthening the distance of the pendulum-bob from the axis of vibration of the pendulum, and again by a train of gearing between the gear directly meshing the rack of the valve and the ratchet-wheel engaging the pawl of the escape-wheel, and, for illustration, as shown and described in my application, Serial No. 284,511, for Letters Patent of the United States, or otherwise, as well known.

An escape-wheel and pallet mechanism such as described may be arranged and combined to operate, as explained, with a valve moving to open and close in a direct straight line (see Fig. 10) in lieu of in a curving line, as before particularly described. Again, said mechanism may be adapted to be operative, as explained, on the valve in its opening movement instead of in its closing movement by simply reversing the relation of pawl R and ratchet-wheel Q described, or to be operative, as explained, on the valve in both its closing and opening movements by duplicating the pawl and ratchet-wheel described and arranging them in relation to each other for one pawl and ratchet-wheel to work and the other pawl and ratchet-wheel not to work in one direction of movement of the valve, and vice versa in the other direction of movement of the valve, and all as shown, Figs. 14 and 15; and, again, an escape-wheel and pallet mechanism such as explained may be applied and arranged to act on the operating-lever D, Figs. 11 and 12, and thus through it on the valve, instead of directly on the valve, as has been before particularly explained.

In all figures corresponding parts are correspondingly lettered.

In Fig. 12, V is a lever-arm swinging on the arbor W of the escape-wheel as a fulcrum and having a pin $n$ engaging a longitudinal notch $r$ in the end of the operating-lever D, and X is a spring-pawl carried by said lever V and at its toe engaging the teeth of the escape-wheel S, all in lieu of the rack N, pinion O, and ratchet Q and pawl R connection before described, but severally performing, as is plain, the same functions. Again, the pendulum may be dispensed with and in lieu thereof a balance-wheel Y and spring Z substituted, Fig. 13, and the balance-wheel may be adapted, as well known, with vanes or blades $Y^2$, or otherwise shaped either to cause or to obviate resistance to its oscillations, and the same may be said of the bob $U^2$ and also of the pendulum U. Stops $A^2 B^2$ for the operating-lever D in each direction of movement thereof are preferably provided.

In Fig. 5, in lieu of the notch $f$ to secure engagement of chain K with pathway J, a swinging and dependent pawl $t$, crossing pathway J, may be provided and arranged to allow chain to pass by and get under it, and then at an abutment by its shoulder $u$ through it have the chain to lift the valve, and, finally, when the valve has been opened to the extent desired, allow the chain to slip off of it because of the then relative positions of pathway, chain, and pawl.

In Fig. 1$^A$ the valve-lever M, heretofore described as separately fulcrumed from the operating-lever, is shown as an arm of the operating end of the operating-lever, and preferably separate from and attached to it by slot and headed screw-bolt and screw-nut, so that its working end may be the better adjusted in its position of work on the shouldered end of the valve-extension and overflow-pipe H. The arrangement of lever M previously described, however, is most preferable, and, if desired, its working end may have a hinged and abutting toe, as shown in Fig. 1$^A$; but it is not necessary. The upward extension H of the valve, preferably, is projected, as shown, Figs. 1, 4, 6, 7, 8, and 9, beyond the side opposite to the hinge $C^2$ of the valve, thereby giving increased weight and leverage on the valve in the closing movement thereof.

Having thus described my invention, what I claim, and desire to secure by Letters Patent of the United States, is—

1. The combination, with a tank for liquid, an outlet-pipe for the liquid, an opening and closing valve to said outlet-pipe, and mechanism adapted to secure an opening and closing of the valve, of an escape-wheel and pallet mechanism geared to the valve or some part connected therewith and essentially composed of an escape-wheel S, a gear-wheel O, and a ratchet-wheel Q, concentrically arranged about a common axis, a pallet T, to engage the escape-wheel, and a pawl R, to engage the ratchet-wheel, substantially as described, for the purpose specified.

2. The combination, with a tank for liquids, an outlet-pipe for the liquid, an opening and closing valve to the outlet-pipe hinged at one side, and a valve-lifting mechanism of the water-closet, of an upward-extending pathway J of the valve and a flexible line K, such as a chain, at one end permanently connected to said valve-lifting mechanism and at the other end permanently connected to and sliding on and lengthwise of said pathway, substantially as described, for the purpose specified.

3. The combination, with a tank for liquids, an outlet-pipe for the liquid, an opening and closing valve to the outlet-pipe hinged at one side, and a reciprocating lever, of an upward-extending pathway J of the valve, a flexible line K, such as a chain, at one end permanently connected to said lever at one side of its fulcrum and at the other end permanently connected to and sliding on and lengthwise of said pathway, an arm M of and on the side of the fulcrum of said lever opposite to said connection of lever and line K and having a free end M³, and a shoulder H⁴ held on the valve for the abutment thereon and escape therefrom of said end M³ of arm M, substantially as described, for the purposes specified.

4. The combination, with a tank for liquids, an outlet-pipe for the liquid, an opening and closing valve to the outlet-pipe hinged at one side, and a reciprocating lever, of an upward-extending pathway J of the valve, a flexible line K, such as a chain, at one end permanently connected to said lever at one side of its fulcrum and at the other end permanently connected to and sliding on and lengthwise of said pathway, a lever M, fulcrumed on a stationary support and having a free end M³ and located below said reciprocating lever and at the opposite side of its fulcrum to its said line-connection with pathway J of valve, a flexible line L, such as a chain, connecting said lever M and said reciprocating lever, and a shoulder H⁴, held on the valve for the abutment thereon and escape therefrom of said end M³ of lever M, substantially as described, for the purposes specified.

5. The combination, with a tank for liquids, an outlet-pipe for the liquid, an opening and closing valve to the outlet-pipe hinged at one side, and a valve-lifting mechanism of the water-closet, of an upward-extending slotted pathway J of the valve, and a flexible line K, such as a chain, at one end permanently connected to said valve-lifting mechanism and at the other end permanently engaged with and sliding on and lengthwise of said slotted pathway, substantially as described, for the purpose specified.

In testimony whereof I have hereunto set my hand in the presence of two subscribing witnesses.

PATRICK W. DOHERTY.

Witnesses:
ALBERT W. BROWN,
GEO. C. BENT.